US008994615B2

(12) United States Patent
Messmer et al.

(10) Patent No.: US 8,994,615 B2
(45) Date of Patent: Mar. 31, 2015

(54) APPARATUS AND METHODS FOR DRIVING SOLID-STATE ILLUMINATION SOURCES

(75) Inventors: Neil Messmer, Langley (CA); Damir Wallener, North Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 716 days.

(21) Appl. No.: 12/436,082

(22) Filed: May 5, 2009

(65) Prior Publication Data

US 2009/0303161 A1    Dec. 10, 2009

Related U.S. Application Data

(60) Provisional application No. 61/059,595, filed on Jun. 6, 2008.

(51) Int. Cl.
*G09G 3/20* (2006.01)
*H05B 37/02* (2006.01)
*G09G 3/14* (2006.01)
*G09G 3/34* (2006.01)
*H05B 33/08* (2006.01)

(52) U.S. Cl.
CPC ............... *G09G 3/14* (2013.01); *G09G 3/2007* (2013.01); *G09G 3/2011* (2013.01); *G09G 3/2014* (2013.01); *G09G 3/3406* (2013.01); *H05B 33/0818* (2013.01); *G09G 2320/0271* (2013.01)
USPC .......................................................... 345/55

(58) Field of Classification Search
CPC .. H05B 33/086; H05B 33/0818; H05B 37/02; H05B 41/36; H02J 7/32; H01S 3/13

USPC .......................................................... 315/291
See application file for complete search history.

(56) References Cited

U.S. PATENT DOCUMENTS

| | | | |
|---|---|---|---|
| 5,736,881 | A | 4/1998 | Ortiz |
| 6,608,614 | B1 | 8/2003 | Johnson |
| 6,871,982 | B2 | 3/2005 | Holman et al. |
| 6,987,787 | B1 * | 1/2006 | Mick ........................ 372/29.021 |
| 7,193,248 | B2 | 3/2007 | Weindorf et al. |
| 7,213,960 | B2 | 5/2007 | Yoo |
| 7,320,531 | B2 | 1/2008 | West et al. |
| 7,322,732 | B2 | 1/2008 | Negley et al. |
| 2003/0090455 | A1 | 5/2003 | Daly |

(Continued)

FOREIGN PATENT DOCUMENTS

DE   10349553 A1   1/2005
DE   102004023186 A1   12/2005

(Continued)

OTHER PUBLICATIONS

Seetzen, H. et al., "A High Dynamic Range Display Using Low and High Resolution Modulators", SID 03 Digst, 2003, pp. 1450-1453.

*Primary Examiner* — Tony N Ngo (57) ABSTRACT

A method for driving a solid-state illumination source to emit light having a brightness determined by a control value involves selecting a control mode based at least in part on the control value. In one embodiment a constant current is supplied to the solid-state illumination source for control values in a low range, a frequency-modulated (FM) current is supplied to the solid-state illumination source for control values in a mid range and a pulse-with modulation (PWM) current is supplied to the solid-state illumination source for control values in an upper range.

41 Claims, 5 Drawing Sheets

(56) References Cited

U.S. PATENT DOCUMENTS

| | | |
|---|---|---|
| 2005/0057554 A1 | 3/2005 | Yamamoto et al. |
| 2006/0017402 A1* | 1/2006 | McKinney et al. ............ 315/291 |
| 2008/0007227 A1* | 1/2008 | Noda ............................ 320/160 |
| 2009/0079360 A1* | 3/2009 | Shteynberg et al. .......... 315/291 |

FOREIGN PATENT DOCUMENTS

| | | |
|---|---|---|
| EP | 0625843 A1 | 11/1994 |
| WO | 9956303 A1 | 11/1999 |
| WO | 02079862 A2 | 10/2002 |
| WO | 03069958 A1 | 8/2003 |
| WO | 03077013 A2 | 9/2003 |
| WO | 2004057921 A1 | 7/2004 |
| WO | 2006002519 A1 | 1/2006 |
| WO | 2006014473 A1 | 2/2006 |
| WO | 2006015476 A1 | 2/2006 |
| WO | 2006071494 A1 | 7/2006 |
| WO | 2006107199 A2 | 10/2006 |
| WO | 2006107369 A1 | 10/2006 |
| WO | 2007050274 A1 | 5/2007 |
| WO | 2007050399 A2 | 5/2007 |

* cited by examiner

APPARATUS AND METHODS FOR DRIVING SOLID-STATE ILLUMINATION SOURCES

REFERENCE TO RELATED APPLICATIONS

This application claims the benefit under 35 U.S.C. §119 of U.S. Application No. 61/059,595 filed on 6 Jun. 2008, entitled APPARATUS AND METHODS FOR DRIVING SOLID-STATE ILLUMINATION SOURCES, which is incorporated herein by reference.

TECHNICAL FIELD

The invention relates to driving solid-state illumination sources such as light-emitting diodes (LEDs).

BACKGROUND

Solid-state light sources are being used in a wide range of lighting applications. For example, Whitehead et al., WO/03077013 discloses a display comprising an array of controllable LEDs.

Some applications require the intensity of light output by solid-state illumination sources to be controlled over a wide range.

SUMMARY OF THE INVENTION

This invention has a wide range of aspects. These include, without limitation, methods for controlling the intensity of light output by solid-state illumination sources, apparatus for driving solid-state illumination sources, and apparatus which includes solid-state illumination sources that can be driven to emit light. In some embodiments the apparatus comprises a display (which may be a television, computer monitor, home theater monitor, or the like) and the solid-state illumination sources emit light that is modulated to provide an image. In some such embodiments the solid-state illumination sources are arranged to provide a backlight for an LCD panel or other spatial light modulator. In some embodiments the brightness of individual ones of, or of groups of, the solid-state illumination sources is varied according to image data.

One aspect provides a method for controlling the intensity of light output by a light emitting diode. The method comprises: obtaining a control value specifying a desired intensity of light to be emitted by the light emitting diode; comparing the control value with a reference value; operating the light emitting diode in a first mode if the control value is less than the reference value; and, operating the light emitting diode in a second mode if the control value is greater than the reference value. Such methods may be applied to drive individual LEDs or groups of LEDs in an array of LEDs.

Another aspect provides a method for controlling the brightness of light output by a light emitting diode. The method comprises: obtaining a control value specifying a desired intensity of light to be emitted by the light emitting diode. The method operates the light emitting diode in a first mode if the control value is less than a first reference value; in a second mode if the control value is greater than the first reference value and less than a second reference value; and, in a third mode if the control value is greater than the second reference value.

Another aspect provides a method comprising: obtaining a control value specifying a desired intensity of light to be emitted by the solid-state illumination source; operating the solid-state illumination source in a constant current mode if the control value is less than a first reference value; operating the solid-state illumination source in a frequency modulation mode if the control value is greater than or equal to the first reference value and less than a second reference value; and, operating the solid-state illumination source in a pulse width modulation mode if the control value is greater than or equal to the second reference value.

Another aspect provides a driver for controlling a solid-state illumination source to emit light. The driver comprises an input for receiving a control value specifying a desired intensity of light to be emitted by the solid-state illumination source and an output connectable to control electrical current in the solid-state illumination source. In some embodiments the driver has a plurality of outputs for controlling a corresponding plurality of different solid-state illumination sources (or a corresponding plurality of groups of solid-state illumination sources in some embodiments). The driver comprises at least one comparison unit for comparing the control value with a first reference value and a second reference value and a constant-current driver for controlling the electrical current to have a constant value corresponding to the control value if the control value is less than the first reference value; a frequency-modulation driver for controlling the electrical current to have pulses at a frequency corresponding to the control value if the control value is between the first and second reference values; and, a pulse-width-modulation driver for controlling the electrical current to have pulses having widths corresponding to the control value if the control value exceeds the second reference value. In some embodiments, the constant-current driver, frequency-modulation driver and pulse-width-modulation driver share components. In some embodiments the constant-current driver, frequency-modulation driver and pulse-width-modulation driver are all provided by a single circuit that can operate in constant-current, FM and PWM modes.

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Solid-state illumination sources such as LEDs may be used to generate light for a wide range of applications. Some example applications are:
- backlights for liquid crystal display (LCD) panels;
- displays comprising arrays of solid-state illumination sources;
- LED signs;
- OLED displays;
- projection systems having laser diodes or other solid-state light sources;
- lighting of art works;
- architectural lighting;
- etc.

Some applications require light having specific qualities such as a desired colour point and intensity, a desired spectral bandwidth or the like.

Figure 1:
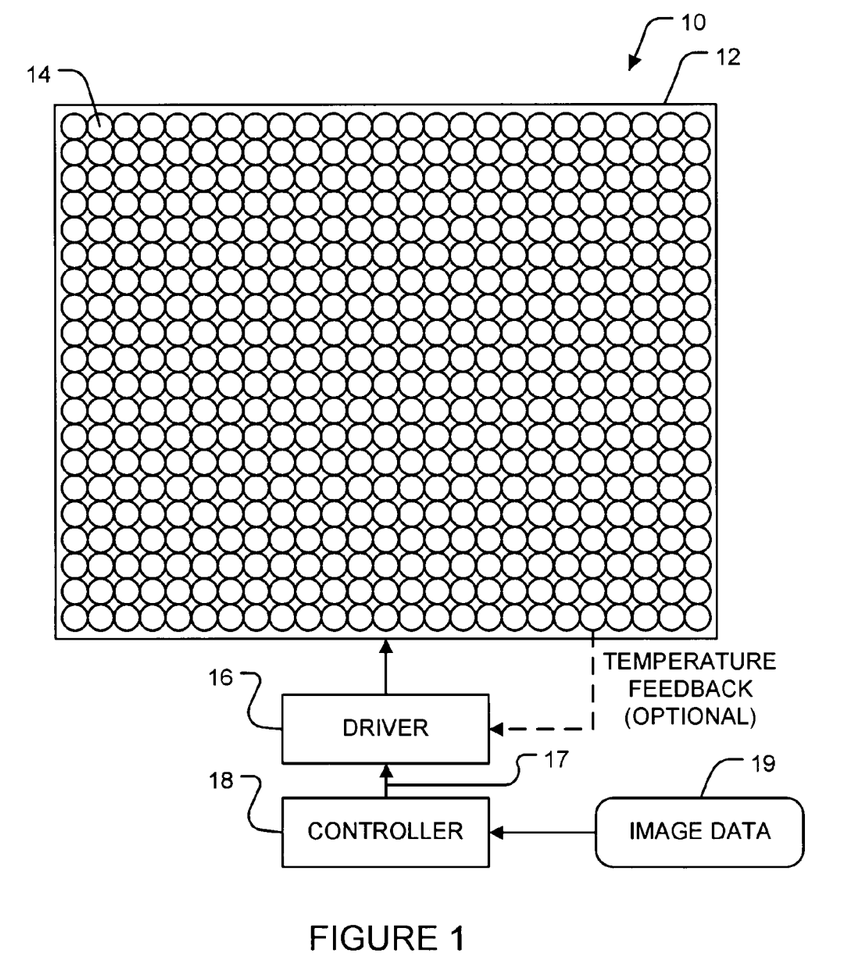
FIG. 1 is a schematic illustration showing a light source comprising an array of LEDs according to an example embodiment of the invention.

FIG. 1 shows a system 10 comprising an illuminator 12 comprising an array of LEDs 14. A driver 16 controls the light output of individual LEDs 14 (or groups of LEDS 14) in response to signals 17 provided by a controller 18. In this embodiment, controller 18 generates signals 17 based on image data 19. Signals 17 may be analog or digital. Signals 17 directly or indirectly specify a desired brightness for the light output by one or more LEDs 14 or groups of LEDs 14.

The light-emitting elements of illuminator 12 may, for example, be applied as a light source in a display of the types described in:
- WO 03/077013A2
- WO 02/079862A2
- WO 06/071494A1
- WO 06/107369A1
- WO 07/050274A1
- WO 07/050399A2
- U.S. Pat. No. 6,608,614
- U.S. Pat. No. 6,871,982
- U.S. Pat. No. 7,193,248
- U.S. Pat. No. 7,213,960
- U.S. Pat. No. 7,320,531
- U.S. Pat. No. 7,322,732
- and others.

Figure 2:
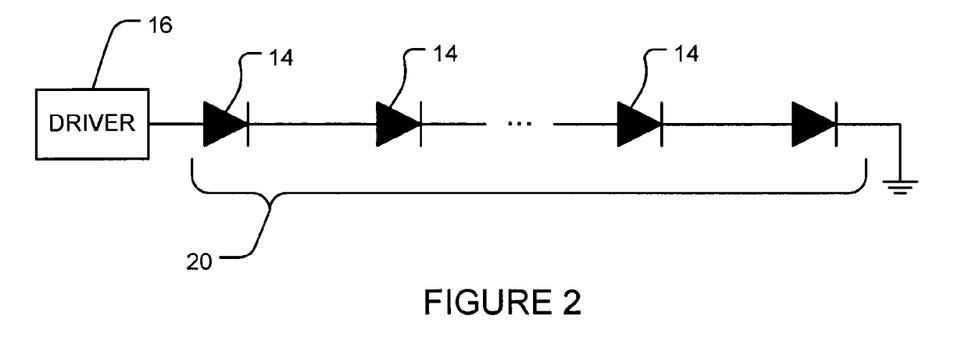
FIG. 2 is a schematic diagram illustrating a cluster of series-connected LEDs.

Driver 16 may separately drive individual LEDS 14 or may drive groups of LEDS 14 together. For example, FIG. 2 illustrates a situation wherein driver 16 controls the electrical current supplied to a group 20 of LEDS 14 that are connected in series.

Figure 3:
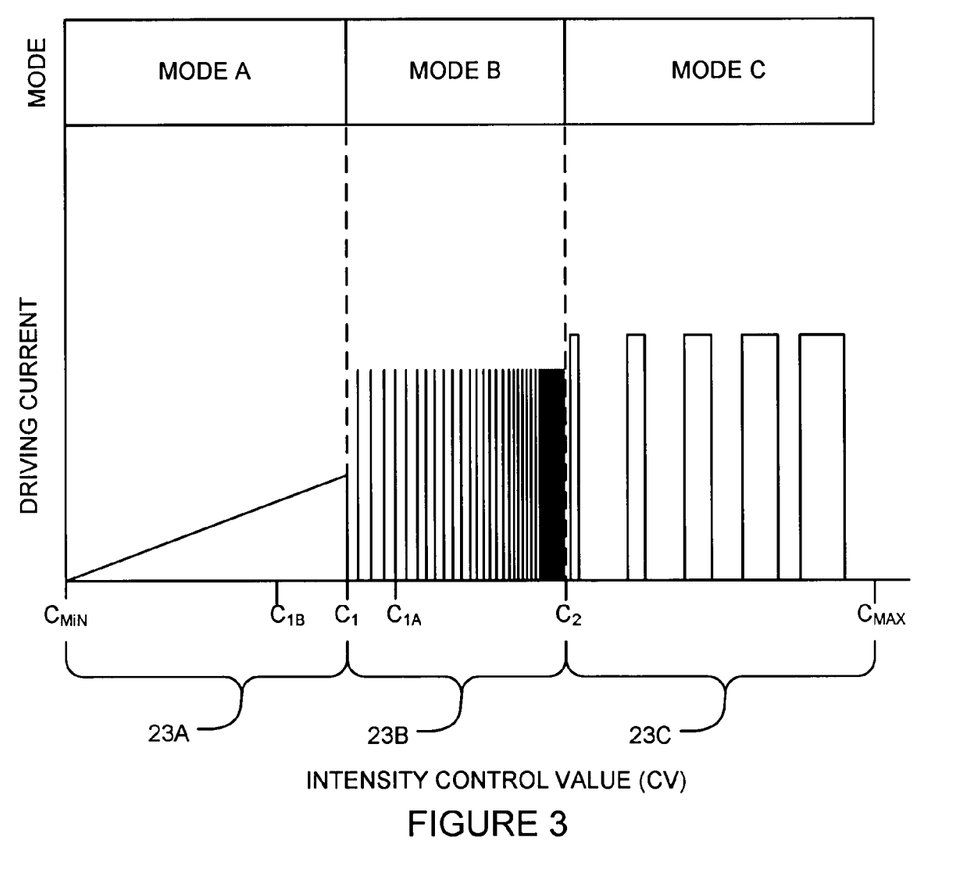
FIG. 3 is a chart illustrating multiple driving regimes for a LED or group of LEDs.

As shown in FIG. 3, driver 16 is configured to drive LEDs 14 (individually or in groups) in one of a plurality of different modes depending upon the control value specified for the LED. In the illustrated embodiment, control values are in the range of $C_{MIN}$ to $C_{MAX}$. In some embodiments $C_{MIN}$ is 0. The control values directly or indirectly specify a desired brightness of light to be emitted by the controlled LED or LEDs. In some example embodiments, control values are:
- integers within a suitable range such as 0 to 255;
- numeric values specifying average light intensity in convenient units;
- amplitudes of analog signals;
- etc.

Signals 17 or the control values specified by signals 17 may have any suitable form.

In the embodiment in FIG. 3, driver 16 has three modes of operation, identified as modes A, B and C. In a first range 23A of control values (e.g. cases where a control value CV is in the range of $C_{MIN}$ to $C_1$), driver 16 operates LEDs in MODE A. In a second range 23B (e.g. cases where control value CV is in the range of $C_1$ to $C_2$) driver 16 operates LEDs in MODE B. In a third range 23C (e.g. cases where control value CV is in the range of $C_2$ to $C_{MAX}$) driver 16 operates LEDs in MODE C. The cases where $CV=C_1$ and $CV=C_2$ may be handled in any suitable manner.

In the illustrated embodiment, MODE A is a constant current mode. In MODE A, for a period corresponding to a current control value CV, driver 16 causes a constant electrical current to flow through the corresponding LED 14. The value of the constant current is some function of the control value CV. The value of the constant current is related to the control value CV by a function $I_{LED}(CV)$. $I_{LED}(CV)$ may be linear. In more general embodiments $I_{LED}(CV)$ may be a linear or non-linear function of the control value.

In the illustrated embodiment, MODE B is a frequency modulation (FM) mode. In this MODE B, for a period corresponding to a current control value CV, driver 16 causes pulses of electrical current to flow through the corresponding LED 14. The pulses may all have the same amplitude. A frequency of the pulses is some function $F_{LED}(CV)$ of the control value CV. The frequency may be linearly related to the control value but in more general embodiments can be a non-linear function of the control value wherein an increase of the control value causes a corresponding increase in the brightness of the corresponding LED 14.

In the illustrated embodiment, MODE C is a pulse width modulation (PWM) mode. In this MODE C, for a period corresponding to a current control value CV, driver 16 causes one or more pulses of electrical current to flow through the corresponding LED 14. The pulses may all have the same amplitude. The amplitude of the pulses in MODE C may be greater that the amplitude of pulses in MODE B in some embodiments. A pulse width of the pulses is some function $PW_{LED}(CV)$ of the control value CV. The pulse width may be linearly related to the control value but in more general embodiments can be a non-linear function of the control value wherein an increase of the control value causes a corresponding increase in the brightness of the corresponding LED 14.

Where LEDs 14 are providing illumination for a display, the display may have a frame rate at which images are refreshed. The frame rate is often at least 20 Hz. Driver 16 may control the intensity of light emitted by LEDs 14 at a rate consistent with the frame rate. In some embodiments, driver 16 controls LED light output for a period equal to a frame cycle in all three modes. For example, for a frame rate of 70 Hz, the period may be about 14 ms. In example embodiments the period is in the range of about 3 ms to about 50 ms.

In some embodiments, LEDs 14 in illuminator 12 are of a plurality of different types. In some embodiments the different types of LEDs each emit light having corresponding spectral characteristics. For example, LEDS 14 may include a first type of LEDs that emit primarily red light, a second type of LEDs that emit primarily green light and a third type of LEDs that emit primarily blue light.

The embodiment illustrated in FIG. 3 advantageously applies each mode at intensity levels for which the mode is well adapted and avoids the use of modes for intensity levels at which the mode has deficiencies. The scheme illustrated in FIG. 3 may be varied in a number of ways. For example:
- The values CV at which driver 16 switches between modes are not necessarily predetermined fixed values. The values may be dynamically set based on factors such as temperature of LEDs 14 or the status of a power supply.
- The FM mode is not necessarily pure FM. MODE 2 may, for example comprise applying a pulse code modulation (PCM) scheme to drive LEDs 14.
- In the FM (or PCM) and PWM modes, it is not mandatory that the pulse amplitude remain fixed for all different control values CV. In some embodiments, the pulse amplitude is also a function of CV.

In the FM (or PCM) and PWM modes, the starting times of driving pulses may be modified by a factor that varies with time in a random or random-like way, or the duty cycle of driving pulses may be modified by a factor that varies with time in a random or random-like way and the amplitudes may be modified by a complementary random or random-like factor to maintain the desired brightness.

Instead of switching suddenly from one mode to the next, driver 16 may drive LED 14 in hybrid modes for some ranges of control values in the vicinity of $C_1$ and/or $C_2$.

In some embodiments, switching between modes has some hysteresis. For example, when control values are increasing, driver 16 may shift from MODE 1 to MODE 2 at a first control value $C_{1A}$. When control values subsequently decrease, driver 16 may not shift back to MODE 1 until the control values are lower than a second control value $C_{1B}$ with $C_{1B} < C_{1A}$.

In some embodiments the functions that relate control values to current, frequency and/or pulse width are also functions of other factors such as temperature of the LEDs or other solid-state illumination sources being driven.

In some embodiments in which LEDs or other solid-state illumination sources of a plurality of different types are controlled by one or more drivers 16, the characteristics of the modes, the functions which map control values to variables of the modes and/or the control values at which modes are switched between may be different for some or all of the different types of LED 14.

In some embodiments, the frequency of the driving current in the PWM mode is decreased (either continuously or step-wise) for increasing control values.

In some embodiments, the pulse width in the FM mode is increased (either continuously or step-wise) for increasing control values.

Advantageously, in FM (or PCM) and PWM modes the time between pulses may me maintained to be shorter than a thermal time constant of LEDs 14. Some high-brightness LEDs have thermal time constants on the order of 2 ms to 10 ms. The time constant will depend on factors such as the way in which a LED is packaged and mounted as well as any cooling system that may be provided. For example, in FM MODE 2, the (initial) amplitude of pulses may selected to be low enough that the initial frequency exceeds 1/TC where TC is the time constant. Similarly, the change to PWM mode may occur at a control value such that, at the frequency and amplitude of the PWM driving current, the pulses are initially long enough that the gaps between pulses are shorter than TC. This is advantageous because it reduces or avoids thermal cycling that can cause emitted illumination to undergo color shifts.

Figure 3A:
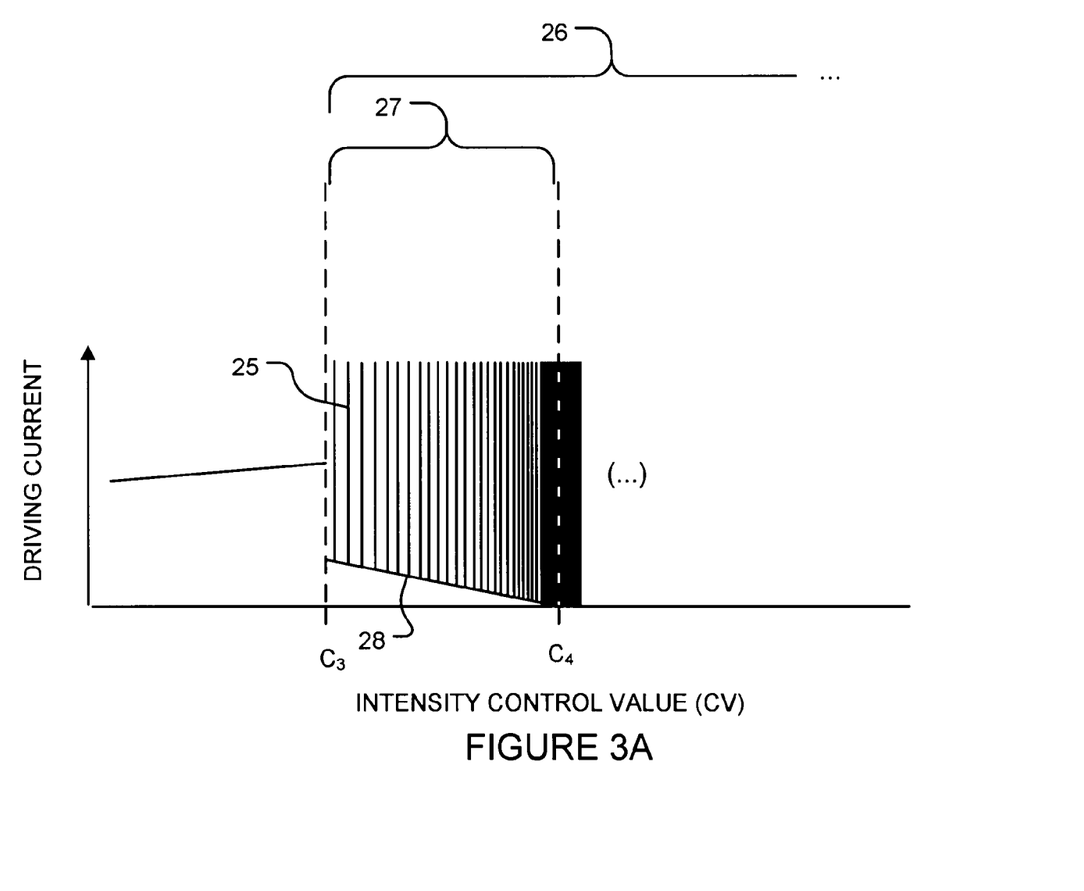
FIG. 3A illustrates one way to implement a graduated transition from a constant-current mode to a pulsed mode.

FIG. 3A illustrates one way to implement a graduated transition from a constant-current mode to a pulsed mode, such as a FM mode, a PCM mode or a PWM mode. Some embodiments may implement a graduated transition as shown, for example, in FIG. 3A. In the illustrated transition, a LED is driven in a constant-current mode for control values CV up to a threshold value $C_3$. If the value of CV rises past $C_3$ then driver 16 shifts to a pulsed mode in which current is delivered to the driven LED 14 in pulses 25. For values of CV in a range 26 corresponding to an FM mode, the frequency of pulses 25 is varied in response to CV so that the illumination output by the controlled LED 14 creates a desired perception of brightness.

For a range 27 of values for CV just above threshold value $C_3$ pulses 25 are superposed on a continuous current background 28, such that the current does not drop to zero between pulses 25 in range 27. Background 28 may decrease with increasing values of CV up to a value $C_4$. In this embodiment, for values of CV greater than $C_4$ continuous current background 28 is absent. In region 27, background 28 may decrease linearly or may change in some non-linear manner with increasing CV. At each value for CV, the combination of pulse frequency, pulse width, pulse amplitude and background current is chosen to provide a desired illumination output.

Figure 4:
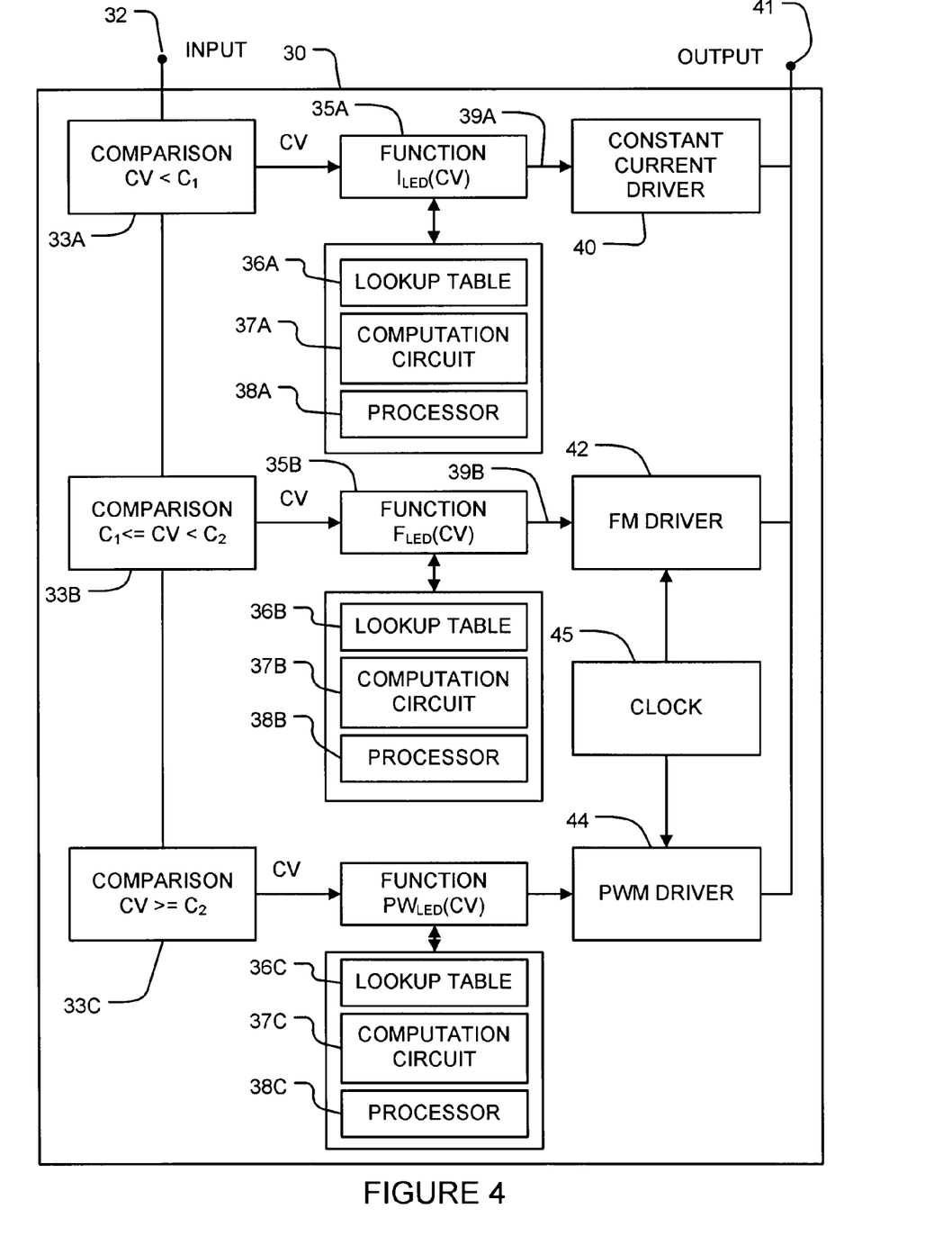
FIG. 4 is a functional block diagram of a driver for a solid-state illumination source according to an example embodiment.

FIG. 4 is a functional block diagram for a LED driver 30 according to an example embodiment of the invention. LED driver 30 has an input 32 that can receive a signal indicating a control value CV. The signal may be in analog or digital form. Input 32 passes the received signal to comparison units 33A, 33B and 33C which respectively determine whether the value of CV provided by the signal corresponds to MODE 1, MODE 2 or MODE 3.

Where comparison unit 33A determines that CV corresponds to MODE 1 then the value of CV is passed to a function calculator 35A that determines a value for a constant driving current based on the value of CV. Function calculator 35A may utilize one or more of a lookup table 36A, a computation circuit 37A or a programmed processor 38A for the purpose of determining the appropriate driving current. An output signal 39A representing the desired driving current controls a constant current driver 40 connected to cause the desired driving current to flow through a solid state illumination device (such as one or more LEDs) connected to output 41.

Where comparison unit 33B determines that CV corresponds to MODE 2 then the value of CV is passed to a function calculator 35B that determines a value for a frequency of a FM or PCM driving current based on the value of CV. Function calculator 35B may also Function calculator 35B may utilize one or more of a lookup table 36B, a computation circuit 37B or a programmed processor 38B for the purpose of determining the appropriate driving frequency. Function calculator 35B may also determine other parameters for the driving current, such as the amplitude and duration of the pulses. An output signal 39B representing the desired driving frequency controls a FM (or PCM) driver 42 connected to cause the desired driving current to flow through the solid state illumination device connected to output 41.

Where comparison unit 33C determines that CV corresponds to MODE 3 then the value of CV is passed to a function calculator 35C that determines a value for a pulse width for a PWM driving current based on the value of CV. Function calculator 35C may utilize one or more of a lookup table 36C, a computation circuit 37C or a programmed processor 38C for the purpose of determining the appropriate pulse width. Function calculator 35C may also determine other parameters for the driving current, such as the amplitude and frequency of the pulses. An output signal 39C representing the desired pulse width controls PWM driver 44 connected to cause the desired driving current to flow through the solid state illumination connected to output 41.

In the illustrated embodiment a clock 45 provides a clock signal to FM driver 42 and PWM driver 44 as a reference used to control timing of output pulses. Outputs 20 of constant current driver 40 FM driver 42 and PWM driver 44 may be maintained in states that do not affect the current at output 41 when they are not invoked. A display or other illumination device may have sufficient drivers 30 to control illumination output by each of a desired number of individually-controlled illumination sources.

In some embodiments the constant-current driver, frequency-modulation driver and pulse-width-modulation driver are all provided by a single circuit that can operate in constant-current, FM and PWM modes. For example, a pulse generator circuit that generates pulses in response to an amplitude value that sets the amplitude of the pulses, a pulse-with value that sets a width of the pulses, and a frequency value that sets a frequency of the pulses may be used to provide a constant current (e.g. by setting the amplitude value to a level corresponding to the desired constant current, setting the frequency to zero and setting the pulse width to a large value). The same circuit may be used as an FM driver by varying the frequency value or as a PWM driver by varying the pulse-width value. The values may comprise values stored in one or more control registers, analog control values, digital control values or the like.

In some embodiments, a driver providing the functions of driver 30 may be implemented by suitable logic circuits coupled to drive power control circuits. These circuits may be provided in many forms including suitable application specific integrated circuits (ASICs), discrete components, combinations thereof or the like. The logic functions may be implemented in hard-wired logic circuits, configurable logic devices such as field programmable gate arrays (FPGAs), processors such as microprocessors or digital signal processors configured to perform methods as described herein for establishing a control signal by executing appropriate software instructions, or the like.

Figure 5:
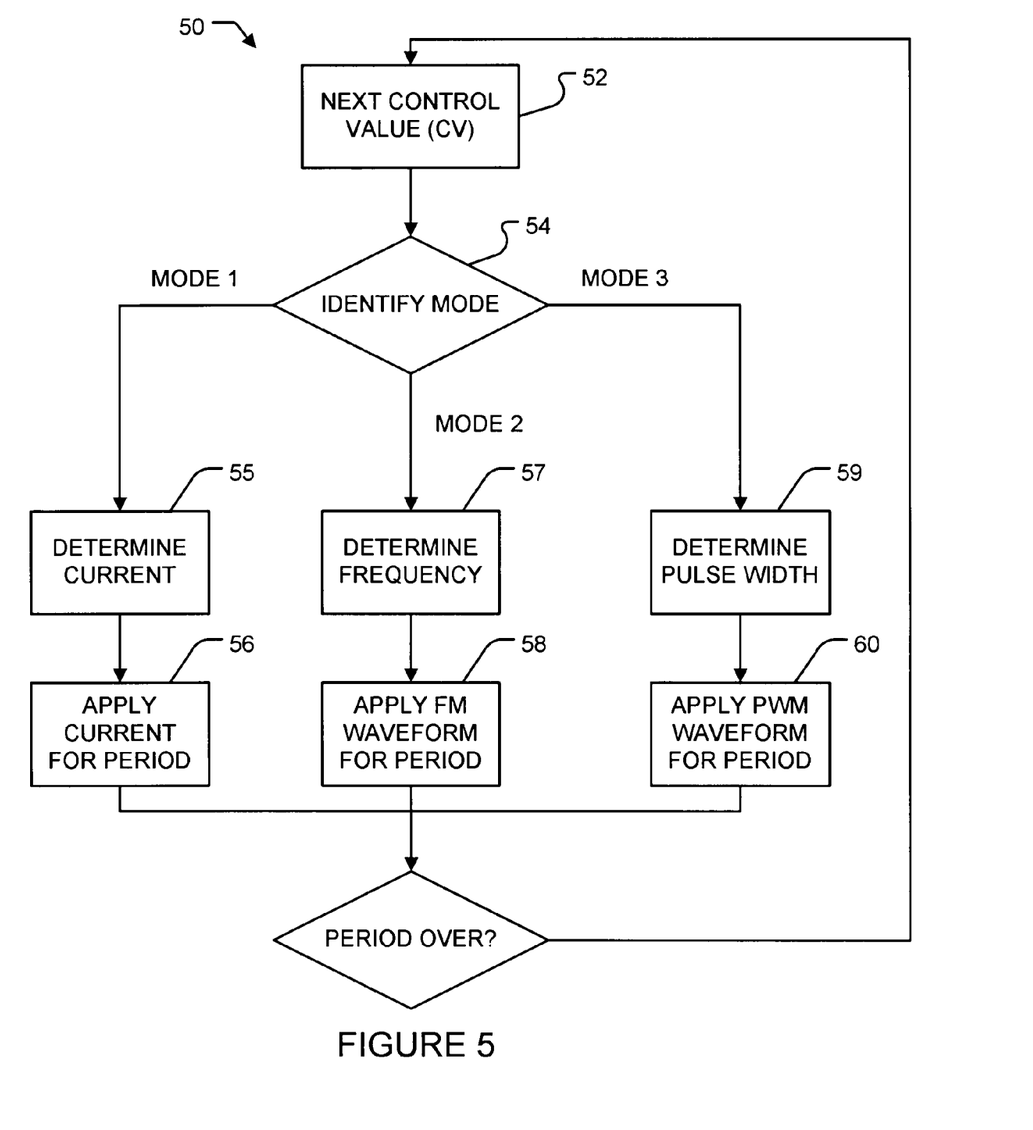
FIG. 5 is a flow chart illustrating a method for driving a solid-state illumination source according to an example embodiment of the invention.

FIG. 5 illustrates a method 50 according to an example embodiment of the invention. Method 50 receives a control value CV at block 52. Block 54 determines whether the control value corresponds to MODE 1, MODE 2 or MODE 3. In the case that CV is in a low illumination range corresponding to MODE 1 a current is determined in block 55 and the current determined in block 55 is applied to the solid state illumination source in block 56.

In the case that CV is in a medium illumination range then a frequency corresponding to CV is determined in block 57 and in block 58 an FM or PCM waveform characterized by the frequency determined in block 55 is applied to the solid-state illumination source.

In the case that CV is in a high illumination range then a pulse width corresponding to CV is determined in block 59 and in block 60 a PWM waveform characterized by the pulse width determined in block 59 is applied to the solid-state illumination source.

The foregoing steps of method 50 are repeated for subsequent periods, which may be subsequent frames in some embodiments.

In some embodiments, method 50 selects a mode corresponding to CV based both on CV and on one or more prior values for CV or on a trend in values for CV. For example, method 50 may provide hysteresis if CV is in a range of values at which it is desired to switch between modes, as described above. Method 50 may include steps to provide any other desired features of the embodiments described above. Method 50 may include other variations such as, without limitation, those variations described above with reference to the scheme illustrated in FIG. 3.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Features of the example embodiments described herein may be combined in any suitable combinations or sub-combinations to yield further example embodiments.

As will be apparent to those skilled in the art in the light of the foregoing disclosure, many alterations and modifications are possible in the practice of this invention without departing from the spirit or scope thereof.

What is claimed is:

1. A method for controlling the brightness of light output by a solid-state illumination source, the method comprising:
   obtaining a control value specifying a desired intensity of light to be emitted by the solid-state illumination source, wherein an increase in the control value corresponds to an increase in the intensity of light;
   operating the solid-state illumination source in only a constant current mode without alternating or combining with any other mode if the control value is within a first range;
   operating the solid-state illumination source in only a frequency modulation mode without alternating or combining with any other mode if the control value is within a second range greater than the first range; and,
   operating the solid-state illumination source in only a pulse width modulation mode without alternating or combining with any other mode if the control value is within a third range greater than the second range.

2. A method according to claim 1 wherein a transition between the first range and the second range occurs at a first value when the solid-state illumination source is being operated in the frequency modulation mode or the pulse width modulation mode, and the transition between the first range and the second range occurs at a second value higher than the first value when the solid-state illumination source is being operated in the constant current mode.

3. A method according to claim 1 wherein a transition between the second range and the third range occurs at a third value when the solid-state illumination source is being operated in the pulse width modulation mode, and the transition between the second range and the third range occurs at a fourth value higher than the third value when the solid-state illumination source is being operated in the constant current mode or the frequency modulation mode.

4. A method according to claim 1 wherein operating the solid-state illumination device in the constant current mode comprises providing the solid-state illumination device with a constant current which is a function of the control value.

5. A method according to claim 4 wherein the constant current is a linear function of the control value.

6. A method according to claim 1 wherein operating the solid-state illumination device in the frequency modulation mode comprises providing the solid-state illumination device with pulses of current at a frequency which is a function of the control value.

7. A method according to claim 6 wherein the frequency is a linear function of the control value.

8. A method according to claim 6 wherein an amplitude of the pulses is a function of the control value.

9. A method according to claim 6 wherein a width of the pulses is a function of the control value.

10. A method according to claim 1 wherein operating the solid-state illumination device in the pulse width modulation mode comprises providing the solid-state illumination device with pulses of current each having a pulse width which is a function of the control value.

11. A method according to claim 10 wherein the pulse width is a linear function of the control value.

12. A method according to claim 10 wherein an amplitude of the pulses is a function of the control value.

13. A method according to claim 10 wherein a frequency of the pulses is a function of the control value.

14. A method according to claim 1 wherein operating the solid-state illumination device in the constant current mode, frequency modulation mode or pulse width modulation mode comprises operating the solid-state illumination source for a period equal to a frame cycle of a display incorporating the solid-state illumination source.

15. A method according to claim 1 comprising modifying start times of pulses of current in the frequency modulation mode or pulse width modulation mode with a random or pseudo-random factor that varies with time.

16. A method according to claim 1 comprising modifying a duty cycle of pulses of current in the frequency modulation mode or pulse width modulation mode with a random or pseudo-random factor that varies with time, and modifying amplitudes of the pulses with a complementary random or pseudo-random factor.

17. A method according to claim 1 wherein operating the solid-state illumination device in the frequency modulation mode comprises increasing a width of pulses of current as the control value increases.

18. A method according to claim 1 wherein operating the solid-state illumination device in the pulse width modulation mode comprises decreasing a frequency of pulses of current as the control value increases.

19. A method according to claim 1 comprising superimposing current pulses on a continuous current background when operating the solid-state illumination source in the frequency modulation mode if the control value is within a predetermined amount of a transition between the first range and the second range.

20. A method according to claim 19 wherein the continuous current background decreases as the control value increases.

21. A method according to claim 1 wherein operating the solid-state illumination source in the frequency modulation mode comprises selecting a frequency of pulses which exceeds a reciprocal of a thermal time constant of the solid-state illumination source.

22. A method according to claim 1 wherein operating the solid-state illumination source in the pulse width modulation mode comprises maintaining gaps between adjacent pulses shorter than a thermal time constant of the solid-state illumination source.

23. A method according to claim 1 comprising adjusting a transition between the first range and the second range or a transition between the second range and the third range based on a temperature of the solid-state illumination source.

24. A method according to claim 1 comprising adjusting a transition between the first range and the second range or a transition between the second range and the third range based on a status of a power supply for the solid-state illumination source.

25. A method for controlling the brightness of light output by a solid-state illumination source, the method comprising:
obtaining a control value specifying a desired intensity of light to be emitted by the solid-state illumination source, wherein an increase in the control value corresponds to an increase in the intensity of light;
operating the solid-state illumination source in only a constant current mode without alternating or combining with any other mode if the control value is less than a first reference value;
operating the solid-state illumination source in only a frequency modulation mode without alternating or combining with any other mode if the control value is greater than or equal to the first reference value and less than a second reference value; and,
operating the solid-state illumination source in only a pulse width modulation mode without alternating or combining with any other mode if the control value is greater than or equal to the second reference value.

26. A method according to claim 25 comprising:
comparing the received control value to an immediately preceding control value;
increasing the first and second reference values if the received control value is greater than the immediately preceding control value; and,
decreasing the first and second reference values if the received control value is less than the immediately preceding control value.

27. A method according to claim 25 comprising superimposing current pulses on a continuous current background when operating the solid-state illumination source in the frequency modulation mode if the control value is within a predetermined amount of the first reference value.

28. A method according to claim 27 wherein the continuous current background decreases as the control value increases.

29. A method according to claim 25 wherein operating the solid-state illumination source in the frequency modulation mode comprises selecting a frequency of pulses which exceeds a reciprocal of a thermal time constant of the solid-state illumination source.

30. A method according to claim 25 wherein operating the solid-state illumination source in the pulse width modulation mode comprises maintaining gaps between adjacent pulses shorter than a thermal time constant of the solid-state illumination source.

31. A driver for controlling a solid-state illumination source to emit light, the driver comprising:
an input configured to receive a control value specifying a desired intensity of light to be emitted by the solid-state illumination source, wherein an increase in the control value corresponds to an increase in the intensity of light;
an output connectable to control electrical current in the solid-state illumination source;
at least one comparison unit configured to compare the control value with a first reference value and a second reference value;
a constant-current driver configured to control the electrical current to have a constant value corresponding to the control value only if the control value is less than the first reference value;
a frequency-modulation driver configured to control the electrical current to have pulses at a frequency corresponding to the control value only if the control value is between the first and second reference values; and,
a pulse-width-modulation driver configured to control the electrical current to have pulses having widths corresponding to the control value only if the control value exceeds the second reference value, wherein in operation, only one of the constant-current driver, frequency-modulation driver or pulse-width-modulation driver is applied to control the electrical current in response to the control value.

32. A method for controlling the brightness of light output by a light emitting diode, the method comprising:

receiving a control value specifying a desired intensity of light to be emitted by the light emitting diode, wherein an increase in the control value corresponds to an increase in the intensity of light;

operating the light emitting diode in only a first mode without alternating or combining with any other mode if the control value is less than a first reference value;

operating the light emitting diode in only a second mode without alternating or combining with any other mode if the control value is greater than the first reference value and less than a second reference value; and, operating the light emitting diode in only a third mode without alternating or combining with any other mode if the control value is greater than the second reference value.

33. A display comprising:

an array of solid-state illumination sources; and, a driver configured to control the solid-state illumination sources, the driver comprising:

inputs connectable to receive control values specifying desired intensities of light to be emitted by the solid-state illumination sources, wherein higher control values correspond to higher intensities of light;

outputs connectable to control electrical currents in the solid-state illumination sources;

the driver configured to control the electrical currents according to modes determined based on the corresponding control values, the driver configured to control the electrical currents for illumination sources having control values in a first range in only a first mode without alternating or combining with any other mode, to control the electrical currents for illumination sources having control values in a second range in only a second mode without alternating or combining with any other mode, and to control the electrical currents for illumination sources having control values in a third range in only a third mode without alternating or combining with any other mode, wherein the driver comprises:

a constant-current driver configured to control the electrical current of each solid-state illumination sources having a control value within the first range to have a constant value corresponding to the control value;

a frequency-modulation driver configured to control the electrical current of each solid-state illumination sources having a control value within the second range greater than the first range to have pulses at a frequency corresponding to the control value; and, a pulse-width-modulation driver configured to control the electrical current of each solid-state illumination sources having a control value within the third range greater than the second range to have pulses having widths corresponding to the control value.

34. A display according to claim 33 wherein the control values are based on image data specifying a desired image.

35. A display according to claim 34 wherein the control value of each solid-state illumination source is based on a position of that solid-state illumination source.

36. A display according to claim 33 wherein the each solid-state illumination source is individually controllable.

37. A display according to claim 33 wherein the solid-state illumination sources comprise a plurality of groups of solid-state illumination sources, and wherein each group of solid-state illumination sources is individually controllable.

38. A display according to claim 37 wherein each group of solid-state illumination sources comprises a plurality of series-connected light emitting diodes.

39. A method of displaying an image on a display comprising an array of light emitting diodes, the method comprising:

obtaining image data specifying a desired image;

processing the image date to obtain a control value for each light emitting diode of the array of light emitting diodes, wherein an increase in the control value corresponds to an increase in the intensity of light to be emitted by the light emitting diode;

operating light emitting diodes having control values within a first range in only a constant current mode without alternating or combining with any other mode;

operating light emitting diodes having control values within a second range greater than the first range in only a frequency modulation mode without alternating or combining with any other mode; and, operating light emitting diodes having control values within a third range greater than the second range in only a pulse width modulation mode without alternating or combining with any other mode.

40. A driver for controlling a solid-state illumination source to emit light, the driver comprising:

input means for receiving a control value specifying a desired intensity of light to be emitted by the solid-state illumination source, wherein an increase in the control value represents an increase in the intensity of light;

output means for controlling electrical current in the solid-state illumination source the output means configured to drive the illumination means in a mode determined based on the control values, the input means configured to drive the illumination means having control values in a first range in only a first mode without alternating or combining with any other mode, to drive the illumination means having control values in a second range in only a second mode without alternating or combining with any other mode, and to drive the illumination means having control values in a third range in only a third mode without alternating or combining with any other mode, wherein the output means comprises:

comparison means for comparing the control value with a first reference value and a second reference value;

constant-current driver means for controlling the electrical current to have a constant value corresponding to the control value if the control value is in the first range less than the first reference value;

frequency-modulation driver means for controlling the electrical current to have pulses at a frequency corresponding to the control value if the control value is in the second range between the first and second reference values; and, pulse-width-modulation driver means for controlling the electrical current to have pulses having widths corresponding to the control value if the control value in the third range wherein the control values exceed the second reference value.

41. A display comprising:

arrayed illumination means for emitting light; and, driver means for controlling the illumination means, the driver means comprising:

input means for receiving control values specifying desired intensities of light to be emitted by the solid-state illumination sources, wherein higher control values represent higher intensities of light;

output means for controlling electrical currents in the illumination means, the output means configured to drive the illumination means in a mode determined based on the control values, the input means configured to drive the illumination means having control values in a first range in only a first mode without alternating or combining with any other mode, to drive the illumination means having control values in a second range in only a second mode without alternating or combining with any other mode, and to drive the illumination means having control values in a third range in only a third mode without alternating or combining with any other mode, wherein the output means comprises:

constant-current driver means for controlling the electrical current of each of the illumination means having a control value within the first range to have a constant value corresponding to the control value;

frequency-modulation driver means for controlling the electrical current of each of the illumination means having a control value within the second range greater than the first range to have pulses at a frequency corresponding to the control value; and, pulse-width-modulation driver means for controlling the electrical current of each of the illumination means having a control value within the third range greater than the second range to have pulses having widths corresponding to the control value.

* * * * *

UNITED STATES PATENT AND TRADEMARK OFFICE
CERTIFICATE OF CORRECTION

| | |
|---|---|
| PATENT NO. | : 8,994,615 B2 |
| APPLICATION NO. | : 12/436082 |
| DATED | : March 31, 2015 |
| INVENTOR(S) | : Neil Messmer and Damir Wallener |

Page 1 of 1

It is certified that error appears in the above-identified patent and that said Letters Patent is hereby corrected as shown below:

In the Specification,

In column 6, line 61, "Outputs 20 of constant current driver 40 FM driver 42 and PWM driver 44 may be maintained in states that do not affect the current at output 41 when they are not invoked." is corrected to read --Outputs of constant current driver 40 FM driver 42 and PWM driver 44 may be maintained in states that do not affect the current at output 41 when they are not invoked.--

Signed and Sealed this
Eleventh Day of August, 2015

Michelle K. Lee
*Director of the United States Patent and Trademark Office*